July 6, 1965 R. J. GOETZ ETAL 3,192,733
SPOOL MOUNTING OF DELAY LINE ON LIQUID HELIUM CRYOSTAT
Filed Sept. 25, 1963
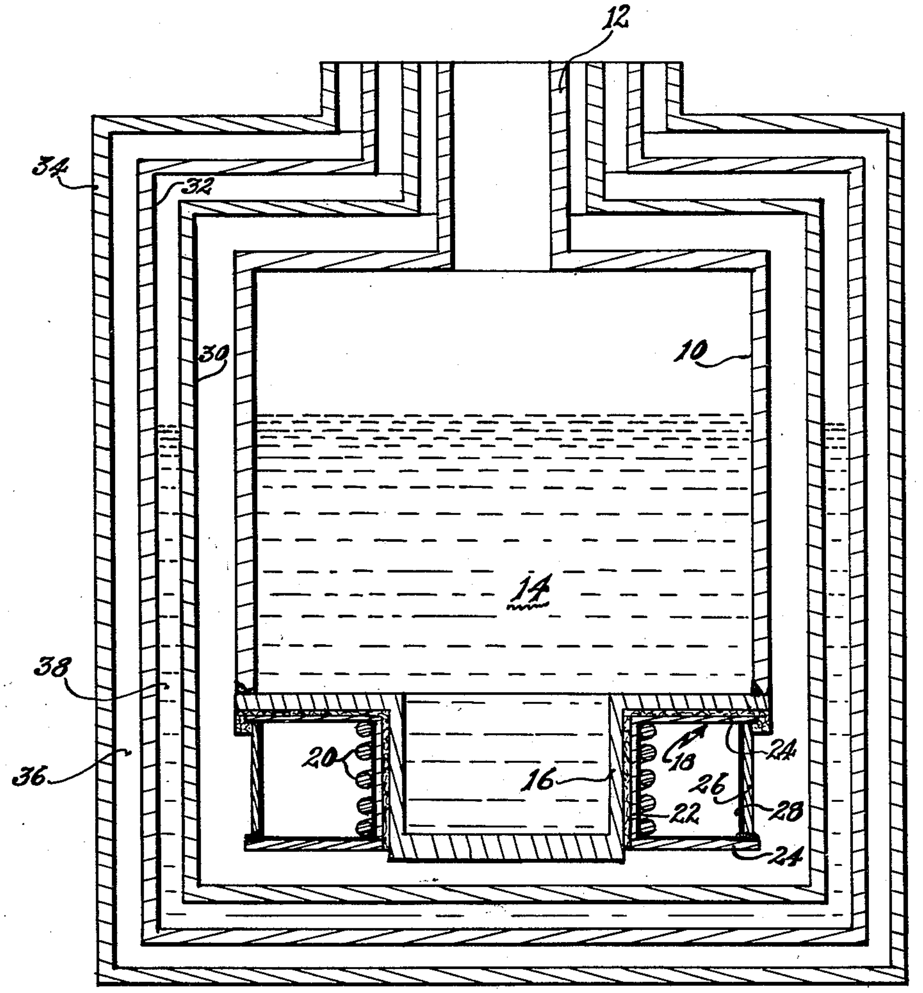
INVENTORS
RAYMOND J. GOETZ &
ALFRED J. CUMMINGS
BY Wade Koontz and
Sherman H. Goldman
ATTORNEYS United States Patent Office 3,192,733

Patented July 6, 1965

3,192,733

SPOOL MOUNTING OF DELAY LINE ON LIQUID HELIUM CRYOSTAT

Raymond J. Goetz, Baltimore, Md., and Alfred J. Cummings, Las Vegas, Nev., assignors to the United States of America as represented by the Secretary of the Air Force Filed Sept. 25, 1963, Ser. No. 311,602
5 Claims. (Cl. 62—45)

This invention relates generally to an apparatus for maintaining long lengths of wire, film or tape at cryogenic temperatures without the direct submersion of the device in the low temperature fluid. The apparatus of this invention is suitable for use with delay or other transmission lines which may be fabricated by, for example, vacuum deposition exterior to the liquid helium container.

Direct submersion of the electronic device in low temperature fluids requires vacuum or pressure seals which become critical at low temperatures. The elimination of contact of the electronic components with the fluid prevents deterioration of vacuum deposited films by eliminating exposure to air, water vapor and other contaminants and also eliminates excessive handling of the deposited films.

Accordingly, it is an object of this invention to provide for an apparatus and method for maintaining long lengths of film, wire or tape at cryogenic temperatures without the submersion thereof in the cooling fluid.

It is another object of this invention to provide for the maintenance of wire or other similar material at cryogenic temperatures by eliminating the submersion of the wire within the coolant fluid, thereby eliminating vacuum or pressure seals in the apparatus.

It is a further object of this invention to provide an apparatus and method for maintaining a wire or similar device at cryogenic temperatures wherein the wire or other material has an extended life due to the elimination of the wire from a deteriorating environment.

It is a still further object of this invention to provide a cryostat apparatus capable of cooling long lengths of wire, tape or similar material wherein the wire is fabricated to a separate spool which is attached to a cryostat thereby facilitating the manufacture of the apparatus.

Another object of this invention is to provide a cryostat apparatus which is easily manufactured of conventional, currently available materials that lend themselves to standard mass production manufacturing techniques.

These and other advantages, features and objects of the invention will become more apparent from the following description taken in connection with the illustrative embodiment in the accompanying drawing, wherein the figure is a representation in schematic form of apparatus capable of maintaining a separate spool of wire at cryogenic temperatures.

The property of superconductivity at low temperatures has been utilized with various electronic devices. Many elements, alloys and compounds are known to be superconductors, i.e., the resistivity of the material is relatively high at normal temperatures; however, at low temperatures the resistivity reduces until their superconductive transition temperature is reached. At this point, the drop off is very great, and below the transition temperature the resistivity is zero D.C. resistance. With alternating currents the resistivity is at a very low value. Generally speaking, materials with good conductivity at normal temperatures do not become superconductive at extremely low temperatures.

The instant invention utilizes the properties of superconductors and provides an apparatus therefor, whereby the material to be cooled is not maintained in the superconducting coolant fluid.

The apparatus of the figure allows for the cooling of a wire film or tape on a spool which is secured to a portion of the cryostat. The cryostat is designated with the numeral 10 and has a filling tube 12 through which the cryogenic fluid 14 is inserted. The cryostat has a portion of reduced diameter at 16 which defines an area for the mounting of a spool 18 with a wire or tape 20 mounted thereon.

The spool 18 has a central, cylindrical portion at 22 which conforms closely to the outside diameter of the portion 16 of the cryostat 10. Flanges 24, together with the cylindrical portion 22, form the spool and the surfaces of the spool which are to be in contact with the cryostat 10 are pre-tinned as are the mating portions of the cryostat in order that they may be soldered together. It is contemplated that the spool holder portion 16 of the cryostat 10 would be made of brass while the remainder of the cryostat could be of stainless steel. It is also contemplated that the spool would be of brass. A cylindrical brass casting 26 may be utilized as a shield around the spool to provide for thermal conductivity to keep the wire within the spool at cryostatic temperatures. The casting 26 may be soldered to the flanges 24 of the spool in order to affix it thereto.

The device thus far described is formed of two separately manufactured items which are assembled together after a strip delay line or wire is deposited, for example, by means of vacuum deposition on the spool. This enables more accurate control of the application of the electronic circuitry to the spool at the situs of manufacture of or operation on the spool. The brass casting 26 may be provided with a coating 28 on its inner surface of lead or other material which exhibits the phenomenon of superconductivity at a temperature which is greater than or equal to the temperature of the fluid 14, e.g., helium. The addition of the lead provides a magnetic shield for the interior of the spool containing the electronic circuitry 20.

In addition, a cylindrical container 30 may be provided after assembly of the spool to the cryostat to surround the assembly and provide a vacuum space between it and the assembly. Concentric shields 32 and 34 also surround the thus far described assembly in order to create a second vacuum shield at 36 and a fluid shield of, for example, liquid nitrogen at 38 which is at a temperature greater than or equal to the temperature of the fluid 14 in the cryostat 10. The shield may be made of copper or brass while the magnetic shield may be obtained by the plating of lead or some other superconductor.

Thus, once the complete apparatus is assembled, it may be operated by filling its container through its neck with a cryogenic fluid such as liquid helium to a point above the spool holding portion 16, the wire or other electric electronic apparatus having been previously formed on the interior of the surface 22 of the spool is thereafter maintained at a reduced temperature for superconductivity. When the wire 20 is connected to a circuit for its operation, the conventional methods of lead out of the ends of the wire should be provided through the walls and shielding. Lead shielding may also be provided on the interior of the spool.

Although the invention has been described with reference to a particular embodiment, it will be understood to those skilled in the art that the invention is capable of a variety of alternative embodiments within the spirit and scope of the appended claims.

We claim:

1. A cryostat apparatus for maintaining electronic components in a superconducting state comprising a container for cryogenic fluid, said container having a generally cylindrical bottom portion of a predetermined diameter, and a second portion above said bottom portion of a diameter greater than that of said bottom portion, means connected with said second portion for inserting cryogenic fluid in said container, and a spool comprising a cylinder of a size to fit over said cylindrical bottom portion, and a flange at each end of said cylinder, and means for fixedly mounting said spool on said bottom portion in thermal contact therewith, said spool having a volume extending between the outer diameter of said cylinder and said flanges in which electronic components to be cooled to their superconducting state may be mounted.

2. An apparatus as defined in claim 1 including a cylindrical thermal shield connecting said flanges.

3. An apparatus as defined in claim 2 including a coating of a material exhibiting superconductivity at a temperature, which is greater than or equal to the temperature of the cryogenic fluid, on the said spool and said shield thereby shielding said space for the mounting of electrical components from magnetic fields.

4. Apparatus as defined in claim 3 including a vacuum shield, a fluid shield, the temperature of which is greater than the temperature of said cryogenic fluid and a second vacuum shield.

5. An apparatus as defined in claim 3 wherein said electrical components are mounted on said cylinder of said spool.

References Cited by the Examiner

UNITED STATES PATENTS

| | | | |
|---|---|---|---|
| 2,816,232 | 12/57 | Burstein | 62—514 |
| 2,832,897 | 4/58 | Buck | 62—514 |
| 2,892,250 | 6/59 | Bartels | 338—53 |

ROBERT A. O'LEARY, *Primary Examiner.*